United States Patent [19]

Banks et al.

[11] Patent Number: 4,690,041

[45] Date of Patent: Sep. 1, 1987

[54] PREVENTION, ARRESTING AND REMOVAL OF ACCUMULATION OF MOISTURE IN BUNKER STORAGES

[75] Inventors: Henry J. Banks, Pialligo; John R. Wiseman, via Hall, both of Australia

[73] Assignee: Commonwealth Scientific and Industrial Research Organization, Australia

[21] Appl. No.: 841,418

[22] Filed: Mar. 19, 1986

[30] Foreign Application Priority Data

Mar. 19, 1985 [AU] Australia .............................. PG9792

[51] Int. Cl.$^4$ .............................................. A01F 25/13
[52] U.S. Cl. .............................................. 98/57; 34/42
[58] Field of Search ................. 34/38, 42, 235; 98/6, 98/55, 56, 57, 72, 75; 135/93, 94

[56] References Cited

U.S. PATENT DOCUMENTS

| | | | |
|---|---|---|---|
| 190,955 | 5/1877 | Cahill | 98/56 |
| 722,118 | 3/1903 | Liles | 98/56 |
| 1,286,562 | 12/1918 | Doles | 98/56 |
| 1,699,375 | 1/1929 | Renshaw | 98/56 |
| 2,856,838 | 10/1958 | Mack | 98/72 |
| 2,895,400 | 7/1959 | Topf | 98/55 |
| 3,280,473 | 10/1966 | Sullivan | 34/92 |
| 3,412,670 | 11/1968 | Jenn et al. | 98/42.13 X |
| 3,892,169 | 7/1975 | Jarnot | 135/93 X |

Primary Examiner—Harold Joyce
Attorney, Agent, or Firm—Sughrue, Mion, Zinn, Macpeak, and Seas

[57] ABSTRACT

Metabolic processes within particulate durable foodstuffs (for example, grains) which have been stored in storage bunkers produce moisture. To prevent, arrest and/or reduce the accumulation of such moisture, vents are provided at the top and at the side of a storage bunker. Each vent is a pipe. The top-venting pipe is mounted substantially vertically and is provided with a rain shield. The side-venting pipe is closed with a cap which has a perforated or mesh-covered region to permit the ingress of air. The venting arrangement interrupts the normal convection cycle in the stored foodstuff mass and removes moisture-carrying air from the bunker.

5 Claims, 4 Drawing Figures

PREVENTION, ARRESTING AND REMOVAL OF ACCUMULATION OF MOISTURE IN BUNKER STORAGES

TECHNICAL FIELD

This invention concerns stored, durable foodstuffs of a generally particulate nature. More particularly, it concerns a method for the prevention of moisture accumulation within durable foodstuffs and the like which have been stored in storages which are commonly called "bunker storages", and for the removal of accumulated moisture or at least the prevention of further accumulation of moisture if such accumulation has occurred.

BACKGROUND

"Durable foodstuffs" include cereal grains (such as wheat, barley and oats), pulses (including legumes, lentils, soybeans, peas and peanuts), rice, coffee and cocoa beans, and the like. Such foodstuffs may be stored in a bunker storage. A bunker storage was originally formed by excavation of earth but now is usually an above-ground structure consisting of a flat floor of earth or concrete, which may be covered with a water-impervious layer (such as paint, plastic or bitumen), bounded on three sides by walls of earth, sheet metal or concrete. The fourth side is left open when the durable particulate foodstuff (which, for convenience, will be regarded as grain in this specification) is being loaded into the storage. Grain is placed on the floor so as to form a pile within the walls. It is then covered with plastic sheeting and the individual sheets are joined together to form a continuous cover that is secured to the walls to provide an almost sealed envelope surrounding the grain pile. If the walls are of earth, the edges of the cover may be buried in the earthen wall. If the floor is covered with a membrane, the edges of this membrane and of the plastic sheeting may be clipped or otherwise joined together, prior to being secured to the walls. Sometimes the plastic cover is itself covered with earth. The fourth side of the bunker may be closed off at this stage by a retaining wall of concrete or of other suitable material, or the top cover of the grain may be sealed to the floor. Good sealing of the bunker prevents the entry of pests and allows fumigation to be carried out to disinfect the grain held in the bunker.

Unfortunately, when grain is stored in such bunkers, some parts of the grain bulk may become excessively moist during the storage and may consequently suffer degradation through moulding and fermentation. The sources of this moisture may be (a) moisture originally present in the grain, (b) metabolic moisture, derived from the activities of pests, microorganisms and natural processes in the grain, (c) water from leaks in the grain cover, and (d) moisture from the ingress of humid air. The moisture usually collects close to the top surface of the pile of grain, where it may cause a consolidated region of grain to form. This consolidated region of moisture-affected grain usually occurs from 3 to 6 inches below the surface of the grain. When the grain is to be retrieved from the bunker, this consolidated region (which is often spoiled) has to be removed first. The remainder of the grain is then extracted from the bunker. Hitherto, the removal of moisture from grain and other stored, particulate, durable foodstuffs has required the application of hot air or the like, provided by external sources of energy.

DISCLOSURE OF THE PRESENT INVENTION

It is an object of the present invention to provide a method for preventing the accumulation of moisture in durable foodstuffs in a bunker storage, using natural processes.

This objective is achieved by interrupting the natural convective movement of air within grain and the like stored in a bunker storage and providing a top vent through which moisture-carrying air passes to the atmosphere and a side vent which enables air from the atmosphere to replace that leaving through the top vent. To do this, a pipe (or a plurality of pipes) is inserted into the top of the grain through the sheet covering the pile of grain in the bunker storage, so that the inner end of the pipe is below the consolidated region (or below where the consolidated region would form) and a further pipe (or plurality of pipes) is inserted into the side of the pile of grain. The or each top venting pipe has an open inner end and a rain shield fitted to its outer end to prevent the entry of rain into the stored pile of grain. The or each side venting pipe has an open inner end and a closure member at its outer end which includes a perforated or mesh-covered region to permit the passage of air into the pipe but to deny rodents and similar pests access to the pipe. When the top venting and side venting pipes are cleared of grain, this arrangement effectively ventilates the interior of the pile of grain to atmosphere and breaks the internal convection cycle of the stored grain.

Thus, according to the present invention, a method of preventing, arresting and/or reducing the accumulation of moisture in particulate durable foodstuff in a bunker storage having a moisture-impervious sheet over the stored foodstuff comprises the steps of:

(a) inserting at least one top-venting pipe substantially vertically into said foodstuff, through said sheet, for a distance such that the lower end of said top-venting pipe is below the consolidated region (as hereinbefore defined) or below where the consolidated region would form and the upper end of said top-venting pipe is above said sheet;

(b) removing any of said foodstuff that may be present in said or each inserted top-venting pipe;

(c) providing a rain shield on the upper end of said or each top-venting pipe;

(d) inserting at least one side-venting pipe into said foodstuff at the side of the bunker, through said sheet;

(e) removing any of said foodstuff that may be present in the or each side-venting pipe; and (f) closing the outer end of said or each side-venting pipe with a closure member which includes a perforated or mesh-covered region which permits air pass therethrough.

After insertion of each pipe into the foodstuff, a seal between the sheet over the bunker and each pipe is established.

The top-venting pipe may have apertures in its lower region, to increase the surface area over which air may pass into the pipe. Such apertures will usually be slots formed in the pipe. Such slots may be covered with a mesh to prevent the passage of the grain or other particulate, durable foodstuff through the slots and into the interior of the pipe.

Normally, the rain shield will be a conical member made of metal, plastic or some other water-impervious material, which is mounted close to, but clear from, the upper end of the top-venting pipe.

However, other forms of rain shield may be used, including a ventilator equipped with a wind-operated extractive rotor.

These and other features of the present invention will be better understood from the following description of embodiments of the invention, in which reference will be made to the accompanying drawings.

DETAILED DESCRIPTION OF THE ILLUSTRATED EMBODIMENTS

Figure 1:
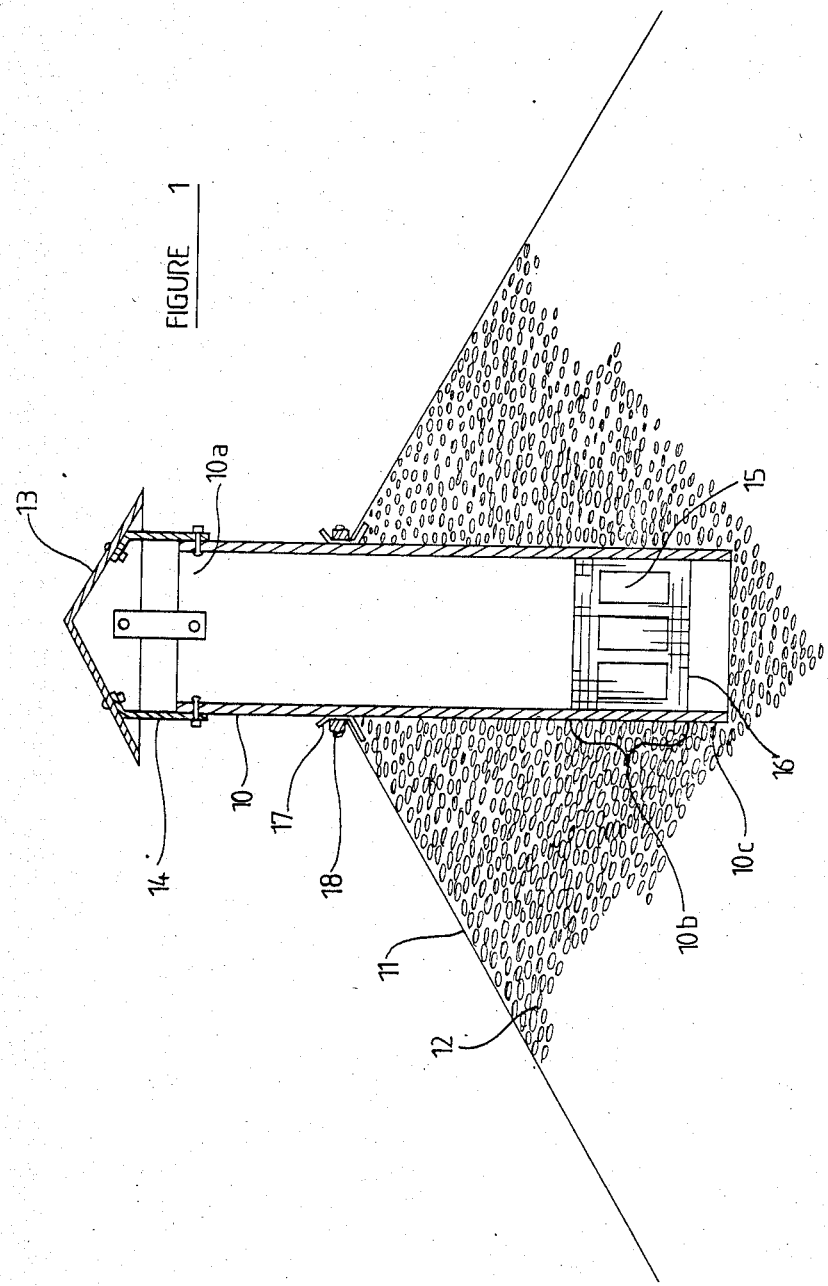
FIG. 1 is a vertical sectional view, partly schematic, through the ridge of a storage bunker filled with grain, into which a top-venting pipe constructed in accordance with the apparatus of the present invention has been inserted.

Accumulation of moisture within grain in a bunker storage occurs principally in the region of the ridge or peak of the storage. Accordingly, as shown in FIG. 1, one or more top-venting pipes 10 are inserted through the cover sheet 11 on top of the grain 12 and into the grain along the ridge of the bunker, to a depth of up to 1 meter, to provide top vents for the bunker. The depth of insertion is such as to penetrate any consolidated regions of the grain mass near the ridge, so that the lower end 10B of the pipe is in free-running grain. The lower region 10B of pipe 10 contains slots 15, which are covered with a mesh 16 (typically of fibreglass) having a mesh size sufficient to prevent the passage of grain therethrough. The lower end 10C of pipe 10 is open to allow air from within the bunker to enter the pipe. The upper end 10A of the pipe protrudes above the cover sheet 11 (the extent to which pipe 10 protrudes above sheet 11 has been exaggerated in the drawing; in practice it would protrude only a short distance) and is open but fitted with a conical cap 13 to prevent entry of rain into the pipe. The cap 13 may be replaced with a wind-powered rotating ventilator (for example, a ventilator fitted with a Savonius rotor or other known form of rotor) to provide some suction up the pipe when the wind blows.

Although the pipe 10 is shown with its axis vertical, and this represents the preferred orientation of pipe 10, the pipe may be inclined at an angle to the vertical provided the lower region 10B of the pipe is located below the consolidated region and the cap 13 or other protective device fitted to end 10A of pipe 10 does not permit rain to enter the pipe.

In an embodiment of the present invention which has been installed for test purposes in a bunker storage for rice at Grubbs, Arkansas, a series of top vents of the type illustrated in FIG. 1 have been installed along the ridge of the bunker. Each top vent is made of thick PVC pipe, inserted for about 0.6 m into the grain mass, leaving about 0.1 m protruding above the PVC cover of the bunker. The slots 15 of the pipes of these vents are cut in the pipe at about 0.4 m from the surface of the grain mass. These slots have been covered with fibreglass mesh of sufficient fineness to prevent the grains of rice entering the pipe. The grain within the pipe was removed and the pipe was sealed to the bunker cover using a collar arrangement. This form of seal has been included in the illustrated embodiment of FIG. 1. It consists of a collar 17 of PVC sheet which is clamped against the pipe 10 by an external metal ring 18, and sealed to the pipe 10 using a silicone rubber sealant. The collar 17 is attached to the bunker covering 11 by sewing and then coating the sewn join with fibreglass mesh or a similar material coated with an acrylic sealant.

A conical rain shield of galvanised iron is fitted to the top of each pipe of the test embodiment using thin metal struts (struts 14 in the FIG. 1 embodiment). This type of rain shield allows free passage of air over the top of the pipe. The rain shield of the test embodiment is fixed in such a way that it can be detached easily and replaced by a cap of PVC that seals off the pipe when ventilation is not required. In other embodiments, the upper end of the top-venting pipe may be closed by an internal bung or threaded closure member (preferably of a thermally insulating material to prevent condensation on its inner surface).

Figure 2:
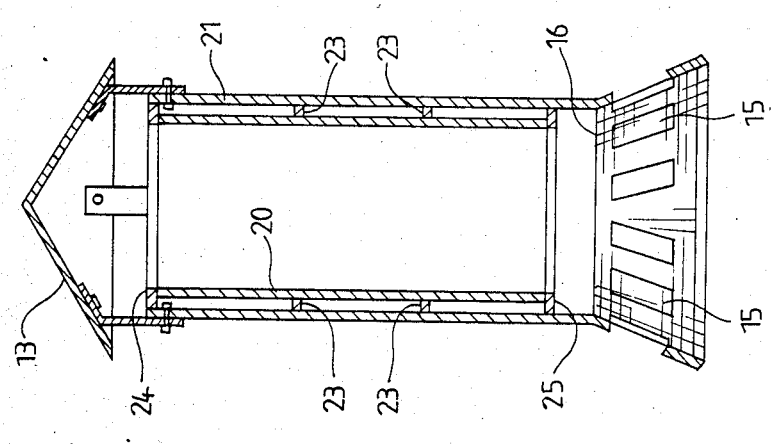
FIG. 2 is a sectional view of a modified form of the pipe used in the embodiment of FIG. 1.

A modified form of the top vent is illustrated in FIG. 2. This illustration of the top vent has slots 15 formed in a skirt region 22 at the lower end of its top-venting pipe 10. It is believed that the use of a skirt or increasing diameter in this way improves the flow of moisture-carrying air through the pipe 10.

The top vent of FIG. 2 also comprises a pipe which is formed as a double skin unit, having an inner skin 20 and an outer skin 21, connected by separating members 23 and also joined together at the top of the pipe and above the slots 15 by annular connecting rings 24 and 25. The double skin provides a degree of insulation between the inside of the pipe 10 and the air outside the bunker, which can be improved by filling the space between the inner and outer skins with an insulating material. Such insulation can also be achieved using conventional insulating materials adhered to a single skin pipe, and by constructing the pipe as a thick pipe of a material which is thermally insulating. The test embodiment in Arkansas, referred to above, has its pipes made from thick PVC material.

The use of a pipe having insulating properties is particularly advantageous when the gases leaving the grain mass through a top-venting pipe are moisture laden at a temperature above the dew point but the temperature of the air above the bunker is below the dew point. In the absence of suitable insulation, condensation on the inside face of the pipe 10 is likely. Such condensation will flow down the pipe and into the grain. By providing the insulation, condensation within the tube is prevented. An additional benefit of the insulation is that the gases leaving the grain mass are kept as hot as possible, which maximises the convective up draft through the pipe and thus the rate of withdrawal of moisture-carrying air from the bunker.

The angle of the conical cap 13 should be such that if condensation occurs on the lower face of the cap, the condensed moisture will drain to the lower edge of cap 13 and drip onto the cover 11 and not into the pipe 10. The undersurface of cap 13 may also be treated to minimise the occurrence of condensation or to effectively remove condensation altogether.

Figure 3:
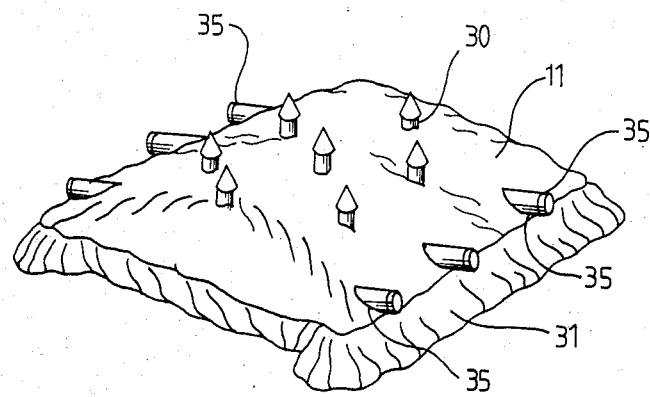
FIG. 3 is a perspective sketch of a bunker storage which incorporates the present invention.

The storage bunker featured in FIG. 3 has earthen walls 31 and a plurality of top vent 30 positioned over the top of the grain., Also shown in FIG. 3 are side vents 35 which extend into the side of the grain mass. In a long bunker, with a plurality of top vents inserted into the grain along the ridge of the bunker, two side vents are normally included for each top vent. In this arrangement (which has been adopted for the test embodiment), the two side vents are positioned directly below their associated top vent, one on each side of the bunker.

Figure 4:
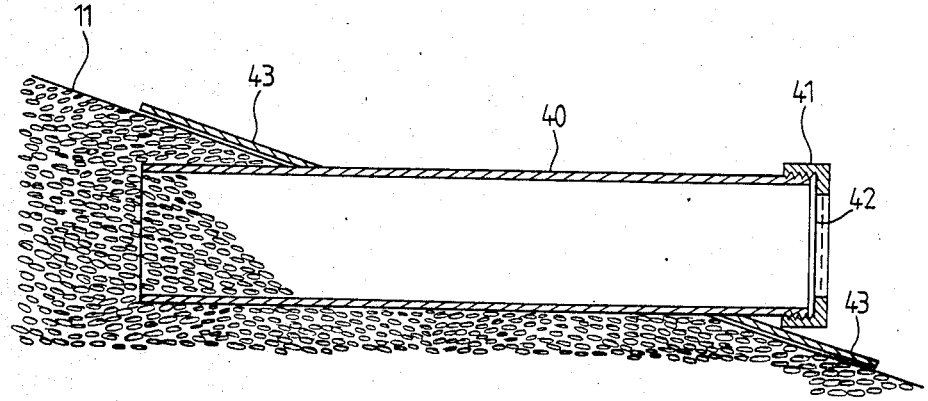
FIG. 4 is a vertical sectional view through a portion of the bunker storage of FIG. 3 which contains a side-venting pipe.

FIG. 4 shows the construction of a preferred form of the side vent. It comprises a length of a metal or plastic pipe 40 of circular cross-section. One end of the pipe 40 protrudes slightly from the bunker so that an end cap 41 can be fitted to it easily. The end cap 41 has a mesh surface 42 to permit entry of air into the grain mass and to exclude rodents from the bunker. The pipe 40 may be sealed off with an alternative end cap with a solid end surface when ventilation of the bunker is not required. The pipe 40 typically penetrates about 0.5 m into the bulk and is cleared of grain except for the small quantity that enters naturally at its inner end from the angle of repose of the grain. An oval-shaped sealing member 43 is welded at an acute angle to the pipe 40 so that the pipe is made to fit into the bunker with a fall of about 3° to the horizontal with the sealing member 43 flush with the bunker cover 11. The edge of the sealing member 43 is sealed to the bunker cover 11 (for example, using a sealant reinforced with tape to provide a gas tight weatherproof seal).

A number of such side vents may be placed along the bunker, spaced at an interval of about two-thirds of the distance from the ridge of the grain to the wall directly down the PVC sheet, to ventilate a larger region of the bunker.

In the absence of the venting units, two counter-rotating convection cells are established in the bunker. With the vents present, an external path is included in this cycle, and fresh air enters the side vents. This fresh air is drawn by convection to the top vent, becoming warmer and moisture-laden in transit. It is then vented to atmosphere through the upper vent.

Both the top and the side ventilating units are closed off when the storage system is required to be fully sealed (for example, for fumigation).

What we claim is:

1. A method of preventing, arresting or reducing the accumulation of moisture in particulate durable foodstuff in a bunker storage having a moisture-impervious sheet over the stored foodstuff comprising the steps of:
   (a) inserting at least one top-venting pipe substantially vertically into said foodstuff, through said sheet, for a distance such that the lower end of said top-venting pipe is below the region where the particulate foodstuff in the bunker consolidates and the upper end of said top venting pipe is above said sheet;
   (b) removing any of said foodstuff that may be present in said or each inserted top-venting pipe;
   (c) providing a rain shield on the upper end of said or each top-venting pipe;
   (d) inserting at least one side-venting pipe into said foodstuff at the side of the bunker, through said sheet;
   (e) removing any of said foodstuff that may be present in the or each side venting pipe; and
   (f) closing the outer end of said or each side-venting pipe with a closure member which includes a perforated or mesh-covered region which permits air to pass therethrough.

2. A method as defined in claim 1, including the further step of sealing the or each top-venting pipe to said sheet and sealing the or each side-venting pipe to said sheet.

3. A method as defined in claim 2, in which the sealing of the or each top-venting pipe to said sheet is effected by surrounding the top-venting pipe with a collar at the point of entry of the top-venting pipe into the stored foodstuff, holding the collar against the pipe with a clamping ring, sewing the lower edge of the collar to said sheet, and applying a sealant composition to the region of contact between the pipe and the collar and to the sewn joint between the collar and the sheet.

4. A method as defined in claim 2, in which the sealing of the or each side-venting pipe to said sheet is effected by providing a flange on the external surface of the side-venting pipe and joining said flange to the cover using a sealant.

5. A method as defined in claim 4 in which said flange is an oval-shaped flange, welded to the side-venting pipe so that the plane of the flange makes an acute angle with the axis of the side-venting pipe.

* * * * *